UNITED STATES PATENT OFFICE.

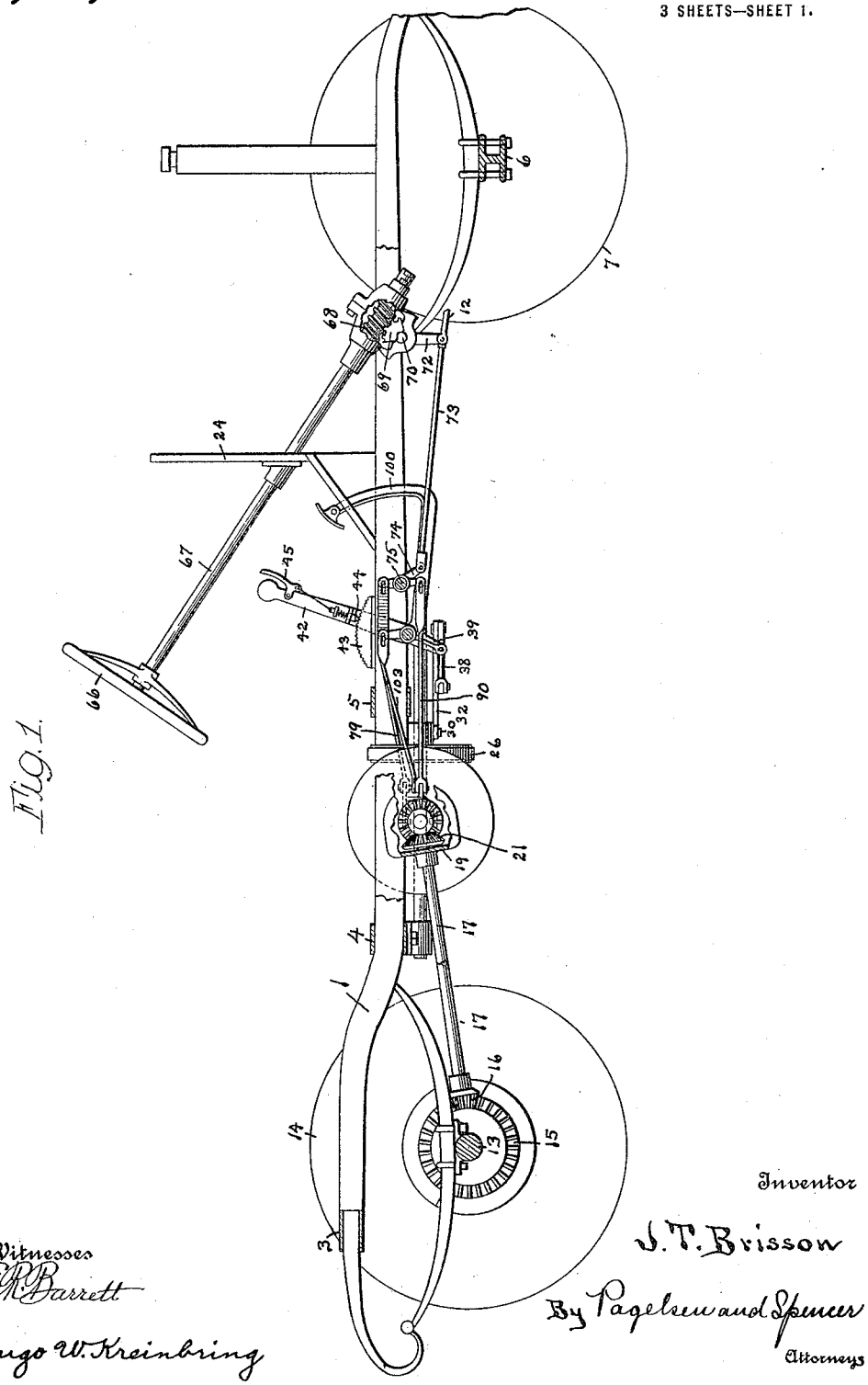

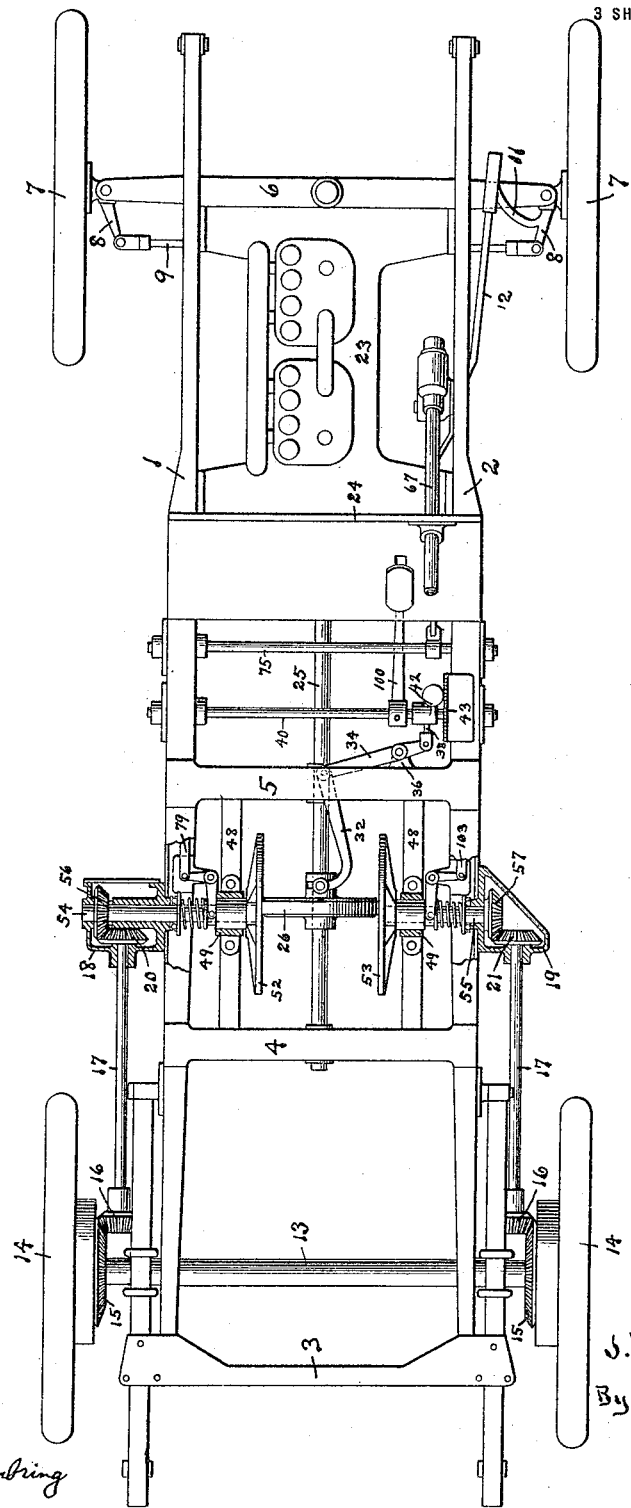

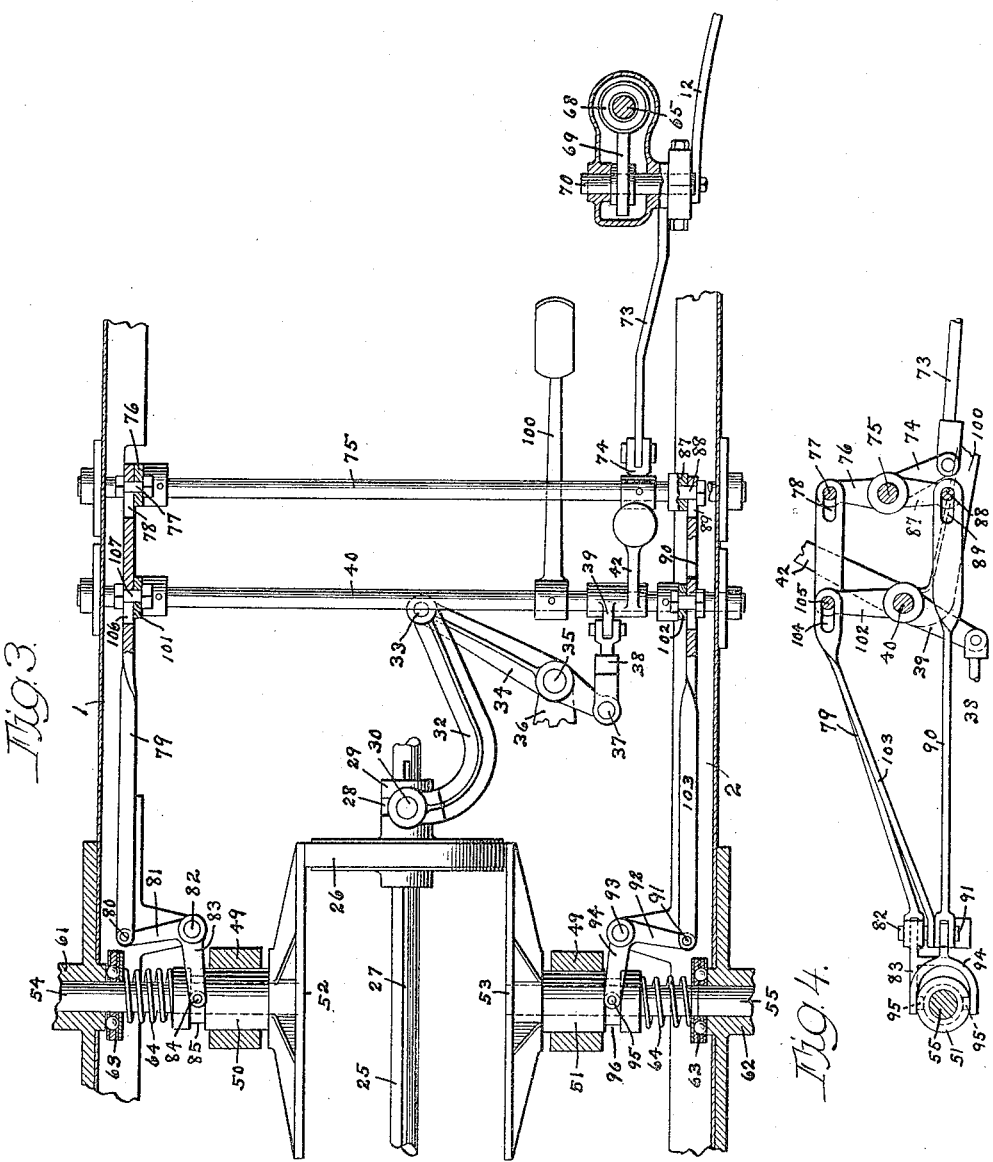

JOSEPH T. BRISSON, OF DETROIT, MICHIGAN, ASSIGNOR OF ONE-HALF TO MAURICE F. KELLY, OF DETROIT, MICHIGAN.

DRIVING MECHANISM.

1,139,634.  Specification of Letters Patent.  Patented May 18, 1915.

Application filed August 12, 1914. Serial No. 856,321.

*To all whom it may concern:*

Be it known that I, JOSEPH T. BRISSON, a citizen of the United States, and a resident of Detroit, in the county of Wayne and State of Michigan, have invented a new and Improved Driving Mechanism, of which the following is a specification.

This invention relates to friction gears, and especially to such as are adapted to drive motor vehicles, and its object is to provide a device of this kind in which either one or both of two driven members can be disconnected from the driving member at will.

This invention consists, in combination with a revoluble driving member adapted to frictionally engage two driven members, of means for simultaneously disengaging both driven members from the driving member, together with means whereby either one of the driven members can be disconnected from the driving member, at will.

It also consists in means connected to the steering mechanism of a motor driven vehicle whereby the movement of said steering mechanism will disconnect one or the other of the driven members from the driving member, according to the direction of movement of said steering mechanism.

This invention further consists in the novel details of construction illustrated in the accompanying drawings and particularly pointed out in the claims.

In the accompanying drawings Figure 1 is an elevation of the driving mechanism of the transmission mechanism of an automobile, showing the wheels in outline and the left-hand member of the chassis in elevation. Fig. 2 is a plan of the chassis and the driving mechanism. Fig. 3 is a plan of the friction drive and controlling mechanism therefor. Fig. 4 is a diagrammatic elevation of the controlling mechanism of the friction drive.

Similar reference characters refer to like parts throughout the several views.

In the drawings the chassis is shown to be formed of side members 1 and 2, connected by means of transverse bars 3, 4 and 5. At the front end of the chassis is an axle 6 having wheels 7 mounted thereon in the usual manner, which wheels may be swung by means of the arms 8, connected by the link 9. To one of the arms 8 is shown connected a third arm 11, from which a link 12 extends rearwardly to the steering post. The rear axle 13 is stationary and on it are revolubly mounted the rear wheels 14, having connected thereto the bevel gears 15. Pinions 16, mounted on the shafts 17, mesh with these bevel gears and the forward ends of these shafts are journaled in casings 18 and 19. Bevel gears 20 and 21 are secured on the front ends of these shafts. An engine 23, of any desired construction, is mounted between the front ends of the side bars 1 and 2 of the chassis, just in front of the dashboard 24, in the usual manner. Extending rearwardly from the engine is a longitudinal shaft 25, which takes the place of the usual propeller shaft, and on this shaft is slidably mounted a driving wheel 26 which has a friction face and is provided in the usual manner with a key that enters the key-way 27, shown in Fig. 3. A collar 28 is mounted in a groove in the hub 29 of this driving wheel, which collar has pins 30 which extend through the forked end of the link 32 mounted on a pin 33 carried by one end of the lever 34, which is pivoted on the pin 35 carried by the bracket 36 on the cross-bar 5. The opposite end of the lever 34 carries a pin 37 which connects by means of the link 38 with the lower arm 39 of a lever loosely mounted on the shaft 40, as indicated in Fig. 4. The upper arm 42 of this lever may be held in any desired position in any desired manner. In Fig. 1 a notched segment 43 is shown, which segment may be mounted on the side-bar 2 in any well known manner. The lever carries a spring-held dog 44 which can be released from the notches of the segment 43 by means of the lifter 45, so that the lever can be swung to move the driving wheel 26 forward or back, and thus increase or decrease the speed of the transverse shafts.

The mechanism thus far described is not new and no claim is made to originality of the details. Other constructions may be substituted therefor.

As shown in Figs. 2 and 3, longitudinal bars 48 extend between the transverse bars 4 and 5 and support the bearings 49 for the hubs 50 and 51 of the friction disks 52 and 53. These hubs are slidable upon but revolve with the shafts 54 and 55, to which the pinions 56 and 57 are secured, which pinions mesh respectively with the gears 20 and 21 on the front ends of the shafts 17. Any other desired mechanism may be used to connect the shafts 54 and 55 and the rear wheels. Constituting a portion of the casings 18 and 19 are the bearings 61 and 62 for the shafts 54 and 55. Thrust bearings 63 are preferably mounted in engagement with the inner ends of these bearings and are engaged by the springs 64 on the shafts 54 and 55, which springs engage the outer ends of the hubs 50 and 51. It will be noticed that when the shaft 25 is revolving, these springs will press the disks 52 and 53 against the driving wheel 26, and will thereby cause the shafts 17 and the rear wheels 14 to be driven by the motor. The tension of these springs will of course depend upon the power to be transmitted.

When the vehicle is to turn corners or alter its direction, one or the other of the rear wheels must slip unless some provision is made to permit different rates of movement of these wheels. Usually a differential gearing is embodied in the rear axle construction or in the construction of a jack-shaft between the shafts connected to the friction disks in engagement with the driving wheel. In order to obviate the necessity of a differential gear construction, means are provided for disengaging either of the disks 52 and 53 from the driving wheel 26 at will, which means are connected to the steering wheel or other steering mechanism of the vehicle in such a manner that the movement of the steering device in either direction to swing the front wheels of the vehicle will cause one or the other of these friction disks to disengage the wheel 26.

The steering wheel 66 is mounted at the upper end of the steering post 67 in the usual manner and on its shaft 65 is mounted a worm 68 which engages the segment 69 mounted on the shaft 70. An arm 72 extends down in the usual manner and connects to the steering link 12 and to the rearwardly extending link 73, which link in turn connects to the crank arm 74 mounted on the shaft 75.

Referring now to Figs. 3 and 4, it will be noticed that an upwardly extending crank arm 76 is secured to the left end of the shaft 75 and carries a pin 77 which extends through a slot 78 on the forward end of the link 79. This link connects at its rear end to a pin 80 in the arm 81 of a bell-crank mounted on the pin 82. The other arm 83 of this bell-crank carries a pin 84 that engages in the groove 85 in the hub 50 of the disk 52. If now the wheel 66 is turned to the right, the arm 72 will be swung back, the crank arm 76 will be swung forward, and the friction disks 52 will be disengaged from the driving wheel 26, and therefore the rear driving wheel on the left side of the vehicle will be permitted to run free, the wheel on the right side being driven at unchanged speed. The result is that there is no change in speed because of the turning of corners by the vehicle and no excessive wear on the tires.

On the right end of the shaft 75 is a crank-arm 87 which carries a pin 88 that extends through the slot 89 in the front end of the link 90. This link is connected to the pin 91 carried by the arm 92 of a second bell-crank lever which is mounted on the pin 93. The second arm 94 of this bell-crank lever carries pins 95 that engage in the groove 96 in the hub 51. When the wheel 66 is turned to the left, the arms 72 and 87 will be swung forward, and the disk 53 will be moved out of engagement with the wheel 26. When the pin 88 moves forward, the pin 77 moves rearwardly, but as it is moving in the slot 78 the disk 52 is not disengaged from the driving wheel. In a similar manner, when the arm 76 moves forward the pin 88 moves rearwardly in the slot 89. It will thus be seen that when the wheel 66 is turned to swing the front wheels of the vehicle, the proper disk 52 or 53 will be disengaged from the driving wheel, and that particular disk is selected to remain in engagement, which will cause the vehicle to substantially continue its movement at the speed at which it was going. As the distance the disks 52 and 53 need to be moved to disengage the driving wheel 26 is very small, it will be apparent that sufficient leverage can be obtained and sufficient power can be applied by the person driving the vehicle to the steering wheel to move these disks out of engagement without much difficulty. By moving both disks 52 and 53 out of engagement with the driving wheel 26, power is entirely cut off from the rear wheels 14 of the vehicle. To accomplish this a pedal 100 is secured to the shaft 40, and two upwardly extending crank arms 101 and 102 are secured to this shaft. A link 103, just above the link 90 and connecting to the pin 91, is provided with a slot 104 in which the pin 105 is slidable. The link 79 is formed with a slot 106 to receive the pin 107 at the upper end of the crank arm 101. If then the lever 100 is forced downward by means of the foot of the driver, the two arms 101 and 102 will carry forward the arms 81 and 92 of the bell-crank levers and cause the disengagement of the disks 52 and 53 from the driving wheel 26. Simultaneously with the forward movement of the links 103 and 79, the link 90 will also be moved forward. This results in the pin 77 sliding in the slot 78 at the forward end of the link 79, and the pin 88 sliding in the slot 89 in the forward end of the link 90.

The construction, proportions and ratios of the different links and levers will, of course, depend upon the type of vehicle upon which they are mounted, and may be

I claim:—

1. In a driving mechanism, the combination with the driving shaft, a driving member mounted thereon, two disks frictionally engaging the driving member, means for simultaneously disengaging both of the disks from the driving member, and means whereby either one of the disks can be disengaged from the driving member at will.

2. In a driving mechanism, the combination with the driving shaft, a driving member mounted thereon, two disks frictionally engaging the driving member, means for simultaneously disengaging both of the disks from the driving member, a steering wheel, and means connected to the steering wheel whereby either one of the disks can be disconnected from the driving member at will.

3. In a driving mechanism, the combination of a revoluble shaft, a friction wheel slidable thereon but revoluble therewith, two friction disks in engagement with said friction wheel, springs to hold said disks in engagement with said wheel, a steering wheel and post, and means connected to said steering wheel whereby either of said friction disks may be disconnected from said friction wheel, depending upon the direction of movement of said steering wheel, a foot pedal, and means connected to said foot pedal for simultaneously disengaging both of the disks from the friction wheel.

4. In a driving mechanism, the combination with a driving shaft, a friction wheel mounted thereon, two disks frictionally engaging the friction wheel, a shaft, a foot-pedal lever connected thereto, means connecting the shaft and the disks whereby movement of the lever may cause the disks to move away from the friction wheel, springs to normally hold the disks in engagement with the friction wheel, and means whereby either one of the disks can be disengaged from the driving member at will.

5. In a driving mechanism, the combination with a driving shaft, a friction wheel mounted thereon, two disks frictionally engaging the friction wheel, a shaft, a foot-pedal lever connected thereto, means connecting the shaft and the disks whereby movement of the lever may cause the disks to move away from the friction wheel, springs to normally hold the disks in engagement with the friction wheel, a steering device, and means connected to the steering device whereby either of the disks can be disconnected from the friction wheel at will.

6. In a driving mechanism, the combination of a revoluble main shaft, a friction wheel slidable thereon but revoluble therewith, two auxiliary shafts extending in line with each other on opposite sides of the main shafts in line with each other, friction disks slidably mounted on the inner ends of the auxiliary shafts, springs for normally holding the disks in engagement with the face of the friction wheel, levers whereby the disks may be moved out of engagement with the wheel, a foot pedal and a hand operated device, and means connecting the levers to the foot pedal and the hand operated device, whereby a movement of the foot pedal will cause both disks to disengage the friction wheel and a movement of the hand operated device will cause one or the other disk to disengage the friction wheel, depending on the direction of movement of the hand operated device.

7. In a driving mechanism for vehicles, the combination of a motor driven shaft, a driving wheel slidable thereon and revoluble therewith, two auxiliary shafts extending at right angles from the motor driven shaft, disks slidably mounted on the inner ends of said auxiliary shafts and revoluble therewith, springs for normally holding the disks in frictional engagement with the driving wheel, means connecting the auxiliary shafts to two wheels of the vehicle, a device for steering the vehicle, and connections between the steering device and the disks whereby one or the other disk is disengaged from the driving wheel according to the direction of movement of the steering device.

8. In a driving mechanism for vehicles, the combination of a motor driven shaft, a driving wheel slidable thereon and revoluble therewith, two auxiliary shafts extending at right angles from the motor driven shaft, disks slidably mounted on the inner ends of said auxiliary shafts and revoluble therewith, springs for normally holding the disks in frictional engagement with the driving wheel, means connecting the auxiliary shafts to two wheels of the vehicle, a device for steering the vehicle, connections between the steering device and the disks whereby one or the other disk is disengaged from the driving wheel according to the direction of movement of the steering device, and means for simultaneously disengaging both disks from the driving wheel.

In testimony whereof I have signed this specification in the presence of two subscribing witnesses.

JOSEPH T. BRISSON.

Witnesses:
EDWARD N. PAGELSEN,
M. E. BROESAMLE.